US012689466B2

(12) United States Patent
Wang et al.

(10) Patent No.: US 12,689,466 B2
(45) Date of Patent: Jul. 21, 2026

(54) METHOD AND SYSTEM FOR RATE-MATCHING AUTO-ENCODERS

(71) Applicant: Samsung Electronics Co., Ltd., Gyeonggi-do (KR)

(72) Inventors: Linfang Wang, Los Angeles, CA (US); Hamid Saber, San Diego, CA (US); Homayoon Hatami, San Diego, CA (US); Mohammad Vahid Jamali, San Diego, CA (US); Jung Hyun Bae, San Diego, CA (US)

(73) Assignee: Samsung Electronics Co., Ltd. (KR)

( * ) Notice: Subject to any disclaimer, the term of this patent is extended or adjusted under 35 U.S.C. 154(b) by 305 days.

(21) Appl. No.: 18/471,092

(22) Filed: Sep. 20, 2023

(65) Prior Publication Data

US 2024/0154722 A1 May 9, 2024

Related U.S. Application Data

(60) Provisional application No. 63/420,024, filed on Oct. 27, 2022.

(51) Int. Cl.
H04L 1/00 (2006.01)
G06N 3/0455 (2023.01)

(52) U.S. Cl.
CPC ......... H04L 1/0069 (2013.01); G06N 3/0455 (2023.01); H04L 1/0013 (2013.01); H04L 1/0057 (2013.01)

(58) Field of Classification Search
CPC ............... H04L 1/0069; H04L 25/0224; H04L 25/0254; H04L 27/2626; H04L 5/0051;
(Continued)

(56) References Cited

U.S. PATENT DOCUMENTS

| | | | |
|---|---|---|---|
| 11,871,243 B2 * | 1/2024 | Sengupta | ............ H04L 27/2613 |
| 2017/0364399 A1 * | 12/2017 | Shi | ......................... H03M 13/13 |

(Continued)

FOREIGN PATENT DOCUMENTS

| | | |
|---|---|---|
| WO | WO 2022/014728 | 1/2022 |
| WO | WO 2022/068757 | 4/2022 |

(Continued)

OTHER PUBLICATIONS

Indoonundon, M. et al., "Overview of the challenges and solutions for 5G channel coding schemes", Journal of Information and Telecommunication, 5(4), 2021-07-21, pp. 460-483.

(Continued)

*Primary Examiner* — Jung Liu

(74) *Attorney, Agent, or Firm* — The Farrell Law Firm, P.C.

(57) ABSTRACT

A method and a system are provided in which a message is encoded, by a neural encoder, to generate a codeword having a first length corresponding to a first code rate of the neural encoder. A number of components of the codeword corresponds to the first code rate. At least one of repeating the components or puncturing at least one of the components is performed to generate a rate-matched codeword having a second length corresponding to a second code rate. The rate-matched codeword is estimated and modified to generate an estimated codeword having the first length corresponding to the first code rate of a neural decoder. The estimated codeword is decoded, by the neural decoder, to generate an estimated message.

19 Claims, 9 Drawing Sheets

(58) Field of Classification Search
CPC . H04L 5/0048; H04L 27/2647; H04L 5/0057;
H03M 13/6375; H03M 13/23; H03M
13/6356; H03M 13/6362; H03M 13/6306;
H03M 13/235; G06N 3/045; G06N
3/0455; G06N 3/0464; G06N 3/094;
G06N 3/0475; G06N 3/047; H04B
7/0626; H04B 7/0619
See application file for complete search history.

(56) References Cited

U.S. PATENT DOCUMENTS

| | | | |
|---|---|---|---|
| 2017/0366205 A1* | 12/2017 | Zhang | H04L 1/0057 |
| 2019/0379484 A1* | 12/2019 | Li | H04L 1/00 |
| 2021/0110261 A1 | 4/2021 | Lee et al. | |
| 2022/0337272 A1* | 10/2022 | Montorsi | H04L 1/0069 |
| 2023/0090593 A1 | 3/2023 | Kim | |
| 2023/0104143 A1 | 4/2023 | Jamali et al. | |
| 2023/0342593 A1* | 10/2023 | Sun | H04L 25/0224 |
| 2025/0139025 A1* | 5/2025 | Lee | G06F 13/1668 |

FOREIGN PATENT DOCUMENTS

| | | |
|---|---|---|
| WO | WO 2022/141397 | 7/2022 |
| WO | WO 2022/177042 | 8/2022 |
| WO | WO 2022/231026 | 11/2022 |

OTHER PUBLICATIONS

Jamali, M. V. et al., "ProductAE: Toward Deep Learning Driven Error-Correction Codes of Large Dimensions", https://arxiv.org/pdf/2303.16424.pdf, Jan. 16, 2023, pp. 2-16.

* cited by examiner

METHOD AND SYSTEM FOR RATE-MATCHING AUTO-ENCODERS

CROSS-REFERENCE TO RELATED APPLICATION

This application claims the priority benefit under 35 U.S.C. § 119(e) of U.S. Provisional Application No. 63/420, 024, filed on Oct. 27, 2022, the disclosure of which is incorporated by reference in its entirety as if fully set forth herein.

TECHNICAL FIELD

The disclosure generally relates to channel auto-encoders (AEs). More particularly, the subject matter disclosed herein relates to improvements to rate-matching in turbo AEs (TAEs).

SUMMARY

Channel codes play an important role in modern digital communication systems in order to enhance transmission reliability. Carefully-designed capacity-approaching channel codes, such as, for example, low-density parity-check (LDPC) codes, polar codes, and turbo codes, have been used in $4^{th}$ generation (4G) and $5^{th}$ generation (5G) wireless communication systems.

Channel code performance has been enhanced using deep learning techniques. For example, an AE may be applied to a code design by replacing the encoder and decoder with neural networks. The neural encoder and decoder may be trained by optimizing weights and biases of the neural networks. Such channel codes may be referred as to channel AEs.

A TAE mimics encoding and decoding of turbo codes by using neural networks to model convolutional code encoders and soft input-soft output decoders in the turbo code. The TAE may have a comparable or better bit error rate (BER) than LDPC codes and polar codes.

In a wireless communication system, rate matching is used to match the number of bits in a transport block to the number of code bits that are transmitted in an allocated resource, according to the code rate. For linear block code, rate matching may be realized by creating a new code with a desired code rate based on a mother code using one or more simple bit-level operations.

One issue with the above approach is that channel AEs are trained and tested for a single code rate and length. The impact of rate matching techniques on the encoder and decoder for channel AEs in not known. Training methods that ensure that a single AE can maintain performance across a range of rates and lengths are not available. Accordingly, current AEs fail to maintain error-correction performance across a range of code rates and lengths, which is required for 4G and 5G communication.

To address these issues, systems and methods are described herein for that apply rate-matching operations for linear block code to a TAE, and propose a rate-matched TAE that uses a single model for various code rates.

The above approaches improve on previous methods because they provide a rate-matched TAE that supports any message-word length that is less than or equal to the message-word length of a mother TAE, and supports any codeword length. A training method may be provided for training the rate-matched TAE. Additionally, a heuristic algorithm may be utilized for searching training SNRs for each code rate of interest. Further, different puncturing patterns may be shown to affect the performance of the rate-matched TAE.

In an embodiment, a method is provided in which a neural encoder of an electronic device encodes a message to generate a codeword having a first length corresponding to a first code rate of the neural encoder. A number of components of the codeword corresponds to the first code rate. At least one of repeating the components or puncturing at least one of the components is performed by a processor of the electronic device to generate a rate-matched codeword having a second length corresponding to a second code rate. The rate-matched codeword is transmitted by the electronic device.

In an embodiment, a method is provided in which a rate-matched codeword having a first length based on a first code rate, is estimated at an electronic device. A processor of the electronic device modifies the rate-matched codeword to generate a codeword having a second length corresponding to a second code rate of a neural decoder. A number of components of the codeword corresponds to the second code rate. The neural decoder of the electronic device decodes the codeword to generate a message.

In an embodiment, a method is provided in which a first set of messages is encoded and rate-matched by a rate-matched neural encoder to generate a first set of rate-matched codewords. The first set of messages comprises subsets corresponding to different code rates. Noise is added to the first set of rate-matched codewords to generate a second set of rate-matched codewords. The second set of rate-matched codewords is modified and decoded by a rate-matched neural decoder to generate a second set of messages. An average loss between the first set of messages and the second set of message is determined across the different code rates. A parameter of at least one of the rate-matched neural encoder or the rate-matched neural decoder is modified based on the average loss.

In an embodiment, a system is provided having a first electronic device and a second electronic device. The first electronic device is configured to encode a message, by a neural encoder, to generate a codeword having a first length corresponding to a first code rate of the neural encoder. A number of components of the codeword corresponds to the first code rate. The first electronic device is also configured to perform at least one of repeating the components or puncturing at least one of the components to generate a rate-matched codeword having a second length corresponding to a second code rate, and transmit the rate-matched codeword. The second electronic device is configured to estimate the rate-matched codeword, and modify the estimate of the rate-matched codeword to generate an estimated codeword having the first length corresponding to the first code rate of a neural decoder. The second electronic device is also configured to decode the estimated codeword, by the neural decoder, to generate an estimated message.

BRIEF DESCRIPTION OF THE DRAWING

In the following section, the aspects of the subject matter disclosed herein will be described with reference to exemplary embodiments illustrated in the figures, in which.

DETAILED DESCRIPTION

Figure 1:
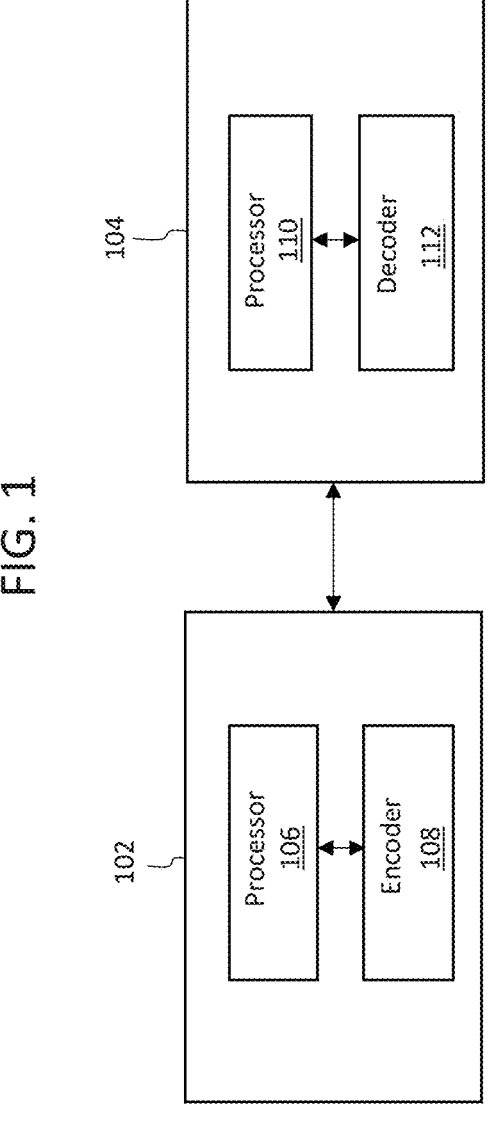
FIG. 1 is a diagram illustrating a communication system, according to an embodiment.

In the following detailed description, numerous specific details are set forth in order to provide a thorough understanding of the disclosure. It will be understood, however, by those skilled in the art that the disclosed aspects may be practiced without the se specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

FIG. 1 is a diagram illustrating a communication system, according to an embodiment. In the architecture illustrated in FIG. 1, a transmitting device 102 includes a first processor 106 in communication with an encoder 108. The transmitting device 102 is in communication with a receiving device 104, which includes a second processor 110 and a decoder 112. The encoder 108 may encode messages (or message-words) into codewords that are sent from the transmitting device 102 to the receiving device 104. The decoder 112 may decode received codewords into messages (or message-words) at the receiving device 104. The encoder 108 and the decoder 112 may be a TAE.

Figure 2:
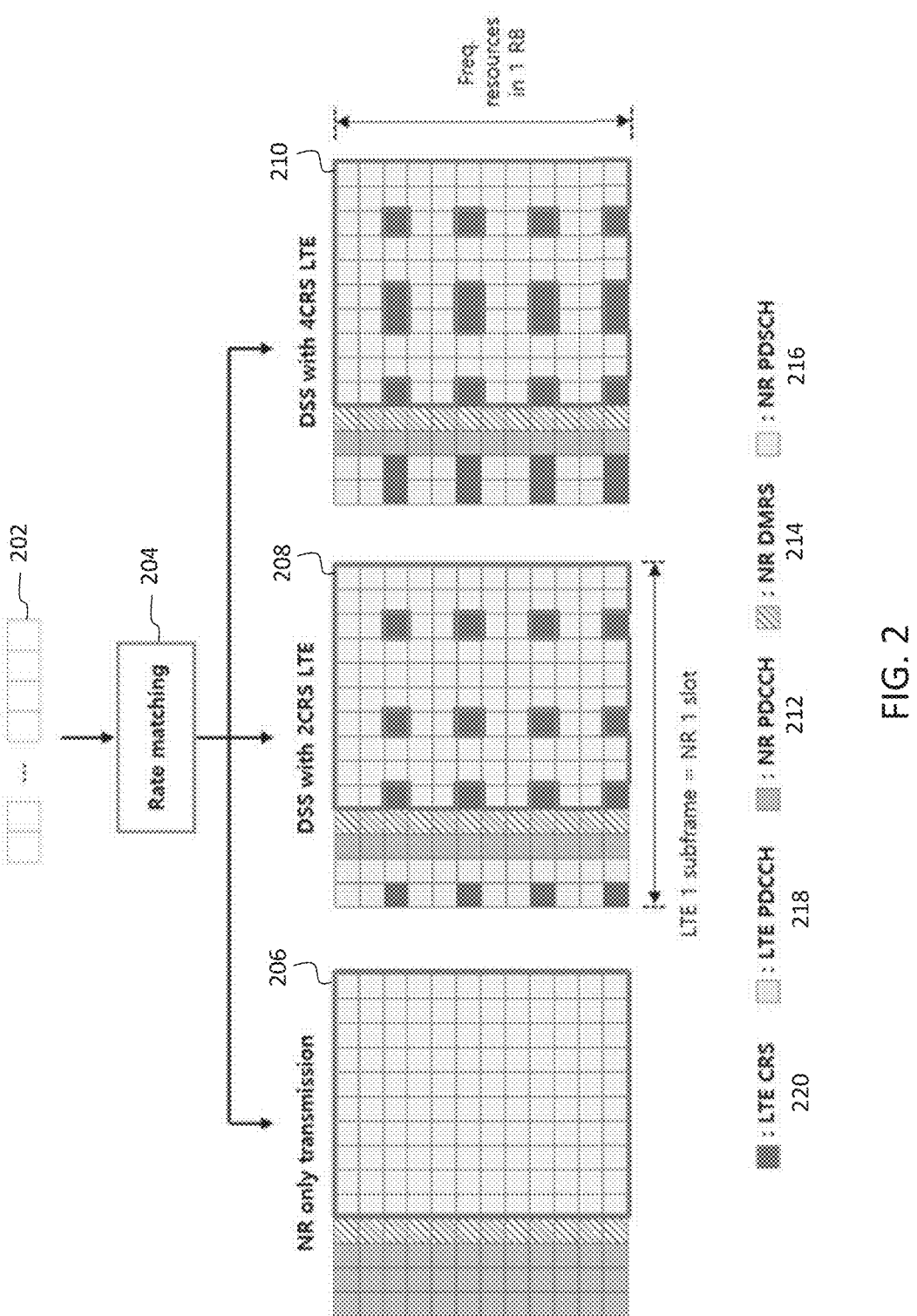
FIG. 2 is a diagram illustrating rate-matching of a new radio (NR) transmission with an existing long term evolution (LTE) transmission, according to an embodiment.

FIG. 2 is a diagram illustrating rate-matching of an NR transmission with an existing LTE transmission, according to an embodiment. A transport block 202 may be provided to a rate-matching block 204, which may result in differently configured resource blocks (RBs) depending on the type of existing LTE transmission. Each RB may be one subframe for LTE, and one slot for NR, at a 15 kHz subcarrier spacing (SCS), for example.

A first RB 206 illustrates a configuration for an NR-only transmission. The first RB 206 may have first symbols allocated to an NR physical downlink control channel (PDCCH) 212, followed by a symbol for an NR demodulation reference signal (DMRS) 214, and the remaining symbols for an NR physical downlink shared channel (PDSCH) 216.

A second RB 208 illustrates a configuration for dynamic spectrum sharing (DSS) with a 2-cell-specific reference signal (CRS) LTE transmission. A third RB 210 illustrates a configuration for DSS with a 4-CRS LTE transmission.

In order for an NR transmission to not affect an existing LTE transmission, CRS should be avoided when allocating NR resources. The basic function of rate-matching in a PDSCH is to match the number of bits in a transport block to the number of bits that can be transmitted in the given resource. The NR PDCCH 212 may be allocated in a symbol after the initial symbols for an LTE PDCCH 218, and may be followed by the NRD DMRS 214. The NR PDSCH 216 may be allocated around existing LTE CRS 220 in accordance with rate-matching without affecting the LTE transmission.

TAE is a deep-learning-based channel code having an error correction performance that is comparable to that of LDPC codes and polar codes. A TAE encoder and decoder are shown and described with respect to FIGS. 3 and 4 below.

Figure 3:
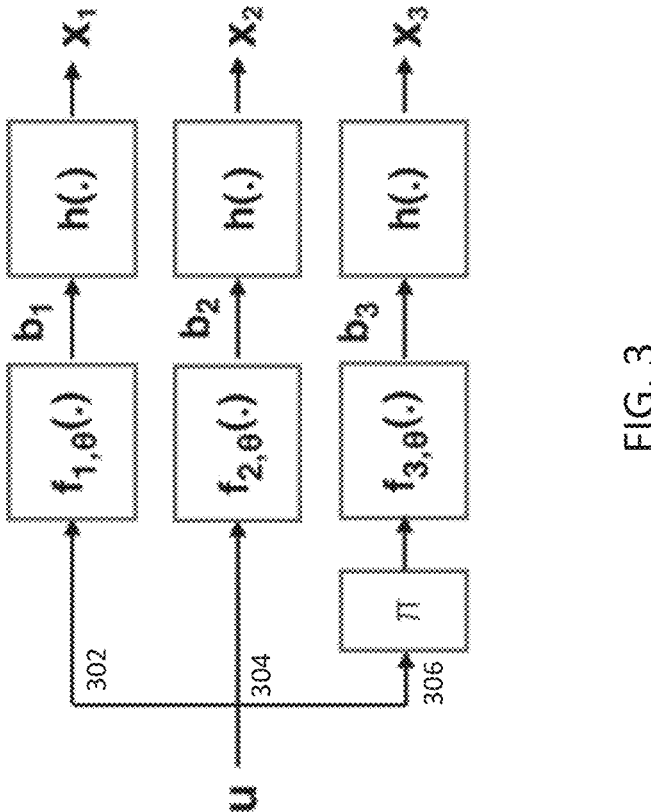
FIG. 3 is a diagram illustrating a TAE encoder, according to an embodiment.

FIG. 3 is a diagram illustrating a TAE encoder, according to an embodiment. A length-k message-word that is to be transmitted may be set to u. Interleaving may be used to add long range memory in the structure of the code, and involves shuffling an input sequence x with a pseudo random inter-leaving array known to both the encoder and the decoder. A code rate ⅓ TAE encodes the message-word u in a first encoding block 302, a second encoding block 304, and a third encoding block 306, resulting in a codeword x with codeword components $x_1$, $x_2$, and $x_3$, as set forth in Equations (1)-(3) below:

$$x_1 = h(f_{\theta_1}(u)) \qquad (1)$$

$$x_2 = h(f_{\theta_2}(u)) \qquad (2)$$

$$x_3 = h(f_{\theta_3}(\pi(u))) \qquad (3)$$

As shown above, $\pi(\bullet)$ is an interleaving operation, and $f_{\theta_i}(\bullet) \in \mathbb{R}^k$ is a neural network modeled by $\theta_i$, i=1, 2, 3. Each $f_{\theta_i}(\bullet)$ is compromised by an $l_{enc}$-layer convolutional neural network (CNN) with $f_{enc}$ kernels size-$s_{enc}$ keels and a fully connected neural network (FCNN) to match the output size. Because the codewords of a TAE are real values, the TAE may not be a coded-modulation. It may be assumed that $x_i = x_{i,1}, \ldots, k_{i,k}]$, for i=1, 2, 3, and $h(\bullet)$ is the power normalization function, such that Equation (4) is derived as set forth below.

$$\frac{1}{k}\sum_{j=1}^{k} x_{i,j} = 0 \qquad (4)$$

It may be assumed that $x = f_{\pi,\theta}(u)$ denotes the TAE encoder, where $x = [x_1, \ldots, x_3] \in \mathbb{R}^n$ is the length-n codeword, and n=3k for the code rate ⅓ TAE.

Figure 4:
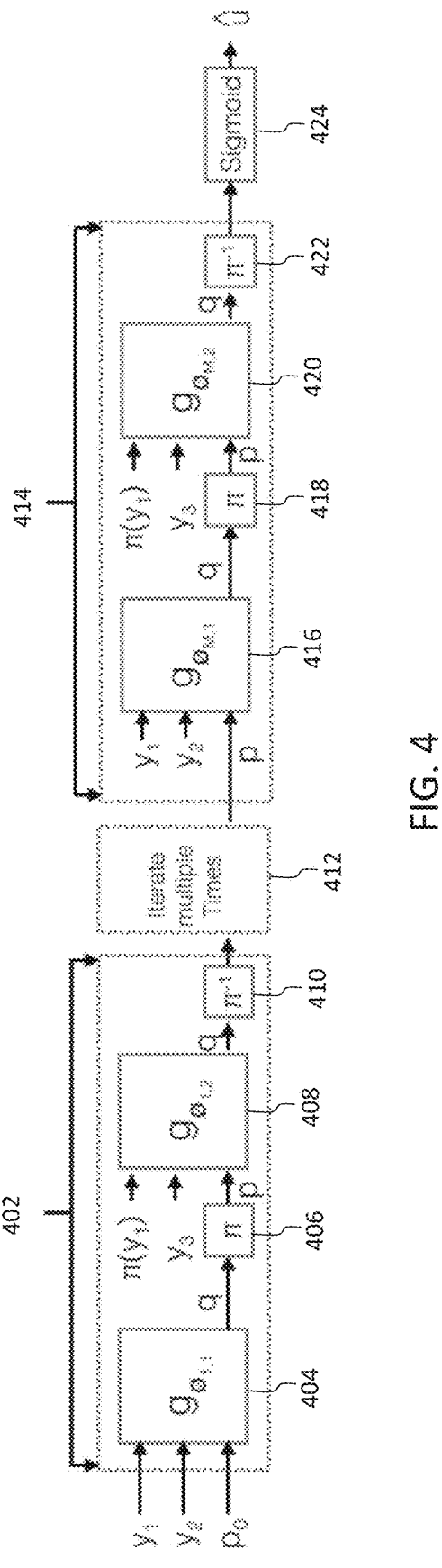
FIG. 4 is a diagram illustrating a TAE decoder, according to an embodiment.

FIG. 4 is a diagram illustrating a TAE decoder, according to an embodiment. The TAE decoder of FIG. 4 is described with respect to reception over an additive white Gaussian noise (AWGN) channel, but embodiments are not limited thereto. It may be assumed that $y = [y_1, \ldots, y_n]$ is a channel observation at a receiver when a codeword x is transmitted as described with respect to FIG. 3, and a resulting relationship, where i=1, \ldots, n, is shown in Equation (5) below.

$$y_i = x_i + z_i \qquad (5)$$

It may be assumed that $z_i$ is a realization of Gaussian distribution $\mathcal{N}(0, \sigma^2)$. Equation (4) may ensure that the averaged symbol power equals 1. The SNR ratio may be defined as $$\frac{1}{\sigma^2}.$$

For the code rate ⅓ TAE, y may be split into three sub-vectors (i.e., $y = [y_1, y_2, y_3]$), where $y_i$ is the channel observation corresponding to $x_i$. The TAE decoder may be treated as an iterative decoder with T iterations. In iteration t, the decoder may accept information $P_{t-1}$ from a previous iteration, combine it with channel observations, and compute information $P_t$, which is either used to feed a next iteration or estimate codewords. At iteration t, $P_t$ is calculated as set forth in Equations (6) and (7) below.

$$Q_{t,1} = g_{\phi,1}(y_1, y_2, P_{t-1}) \qquad (6)$$

$$Q_{t,2} = g_{\phi,2}(y_1, y_2, \pi(Q_{t,1})) \qquad (7)$$

It may be assumed that $Q_{t,i} \in \mathbb{R}^{k \times f}$, t=1, \ldots, T, and i=1, 2, where F is an information feature size for each code bit. $P_t \in \mathbb{R}^{k,f}$ for t=0, \ldots, T-1, and $P_T \in \mathbb{R}^k \cdot \pi(\bullet)$ and $\pi^{-1}(\bullet)$ are the row-wise interleaving and inverse interleaving operation, respectively. $g_{\phi,i,j}$ may be compromised by an $l_{dec}$-layer CNN with $f_{dec}$ size-$s_{dec}$ kernels and an FCNN to match the output size.

For example, FIG. 4 illustrates multiple decoding iterations, with each iteration having two decoders. In a first iteration 402, first and second channel observations $y_1$, $y_2$, and a first de-interleaved prior $p_0$ are provided to a first decoder $g_{\phi,1}$ 404, resulting in first posterior q. The first posterior q is provided to a first interleaver $\pi$ 406, resulting in interleaved prior p. The interleaved prior p, third channel observation $y_3$, and interpolated first channel observation $\pi(y_1)$ are provided to a second decoder $g_{\phi,2}$ 408, resulting in second posterior q. The second posterior q is provided to a first de-interleaver $\pi^{-1}$ 410, resulting in a second de-interleaved prior p.

The second de-interleaved prior p may initially be used in a next iteration of multiple iterations 412, which are identical to the first iteration 402. A resulting third de-interleaved prior p is provided to a final iteration 414, which is identical to the first iteration 402, and includes a third decoder $g_{\phi_{M,1}}$ 416, a second interleaver $\pi$ 418, a fourth decoder $g_{\phi_{1,2}}$ 420, and a second de-interleaver $\pi^{-1}$ 422, resulting in third de-interleaved prior p.

After T iterations, an estimation for the transmitted message-word u may be made by element-wise sigmoid operation at 424, as shown in Equation (8) below.

$$\hat{u} = \text{sigmoid}(P_T) \qquad (8)$$

Some embodiments may use $\hat{u} = g_{\pi,\theta}(y)$ to denote the TAE encoder.

Figure 5:
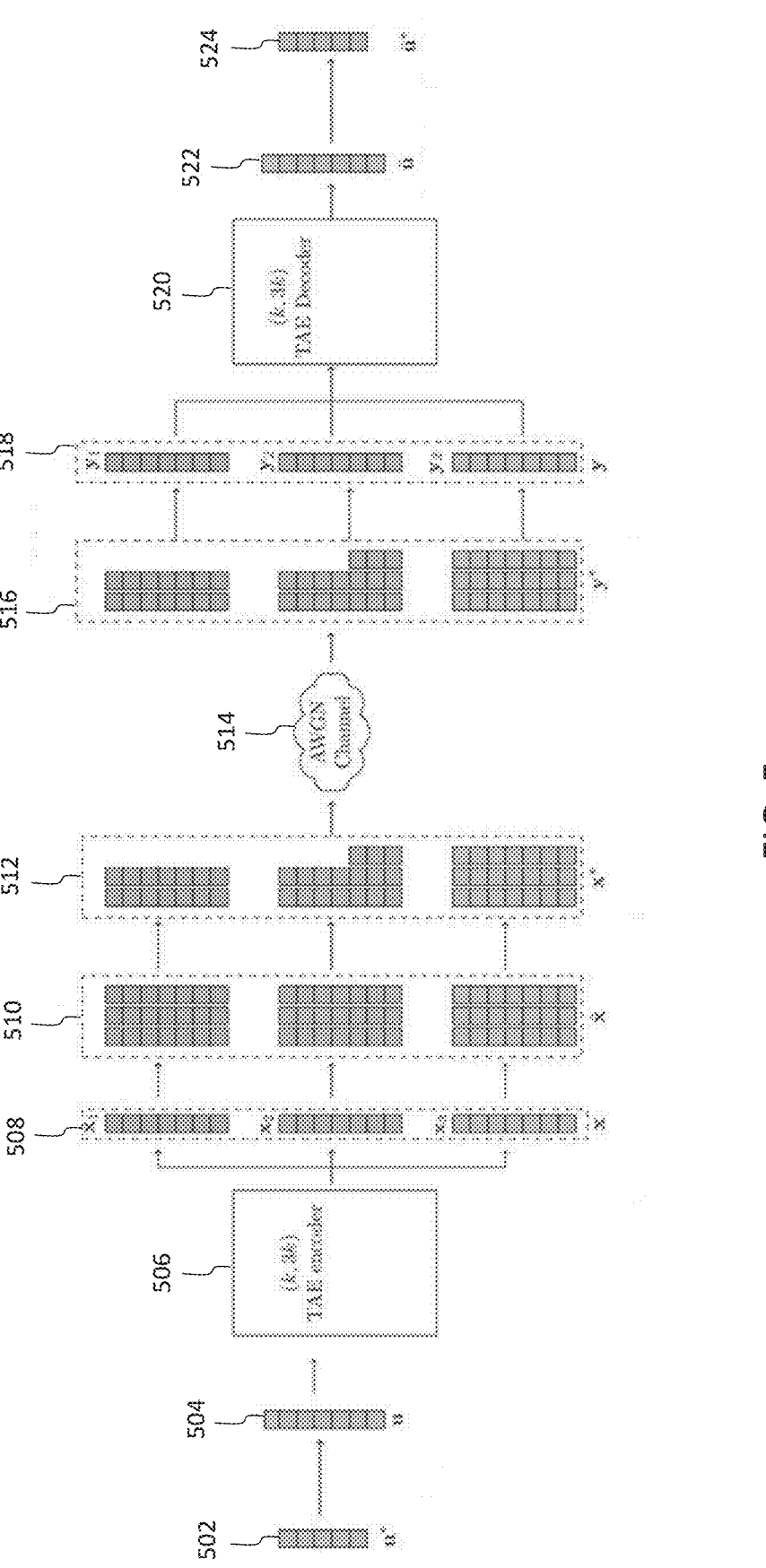
FIG. 5 is a diagram illustrating a rate-matched TAE transmission structure, according to an embodiment.

FIG. 5 is a diagram illustrating a rate-matched TAE transmission structure, according to an embodiment. A code rate r of a (k, n) error correction code may be defined as r=k/n. However, in 4G and 5G communication, a desired code rate may not be r, or may vary depending on available resources. Therefore, rate-matching may be required in order for a given code with rate r to match a desired code rate r*.

For a linear code, a number of simple changes may be made to a generator matrix G to obtain a new code with the desired code rate r*. Such changes may include extending a code by increasing its length n by adding columns to G, puncturing a code by decreasing its length n by eliminating columns from G, and expurgating a code by decreasing the number of data symbols k by eliminating rows from G.

As a non-linear code, a TAE is not able to be described with respect to a generator matrix G, and therefore, the changes for linear codes cannot be directly applied. However, embodiments may borrow concepts from these modifications to linear codes and present a framework for a (k, 3k) TAE to match a desired code rate $$r* = \frac{k^*}{n^*}, \text{ where } k^* < k. \qquad 35$$

The rate-matched TAE may support multiple code rates.

A process for rate-matching a (k, 3k) TAE to the (k*, n*) code with the desired code rate $$r^* = \frac{k^*}{n^*},$$

may be summarized as set forth below.

Initially, it may be assumed that $$u \in \mathbb{F}_2^k$$

is the transmitted message-word. Because the input dimension of the TAE is k, 0's may be padded on both sides of length-k* message-word u* 502 to satisfy an input length requirement, resulting in length-k message-word u 504, as shown in Equation (9) below.

$$u = \left[ \underbrace{0 \; 0 \; \dots \; 0}_{\lfloor \frac{\delta}{2} \rfloor 0's} \; u^* \; \underbrace{0 \; 0 \; \dots \; 0}_{\lceil \frac{\delta}{2} \rceil 0's} \right] \qquad (9)$$

It may be assumed that $\delta = k - k^*$. Equation (9) freezes $\delta$ positions of u 504 and fills information bits to the remaining k* positions. After zero-padding, a TAE encoder 506 may encode u 504 to the codeword x 508, having codeword components $x_1$, $x_2$, and $x_3$, in accordance with $f_{\pi,\theta}(x)$, as described above with respect to FIG. 2 and Equations (1) to (3).

The codeword length of TAE x=[$x_1$, $x_2$, $x_3$] 508 is n. When a desired length-n* codeword x* 512 is longer than n, the length-n codeword x 508 may first be extended to a length pn by repeating codeword x 508 p times, resulting in codeword $\tilde{x}$ 510, as shown below in Equation (10).

$$\tilde{x} = \left[ x^{(1)}, \dots, x^{(p)} \right] \qquad (10)$$
$$= \left[ x_1^{(1)}, x_2^{(1)}, x_3^{(1)}, \dots, x_1^{(p)}, x_2^{(p)}, x_3^{(p)} \right]$$

where $x^{(i)} = x$ and $x_i^{(j)} = x_j$ for $i = 1, \dots, p$ and $j = 1, 2, 3$.

where $x^{(i)} = x$ and $x_i^{(j)} = x_j$ for i=1, . . . , p and j=1, 2, 3.

The number of repetitions p is calculated by Equation (11) below.

$$p = \left\lceil \frac{n^*}{n} \right\rceil \qquad (11)$$

In order to result in the length-n* codeword x* 512, $\alpha = pn - n^*$ symbols in codeword $\tilde{x}$ 510 may punctured. Equation (11) guarantees that $\alpha < n$, and only symbols of $x^{(p)}$ are punctured. FIG. 5 illustrates a head puncturing pattern, however, embodiments are not limited thereto, and a variety of different puncturing patterns may be utilized.

Figure 6:
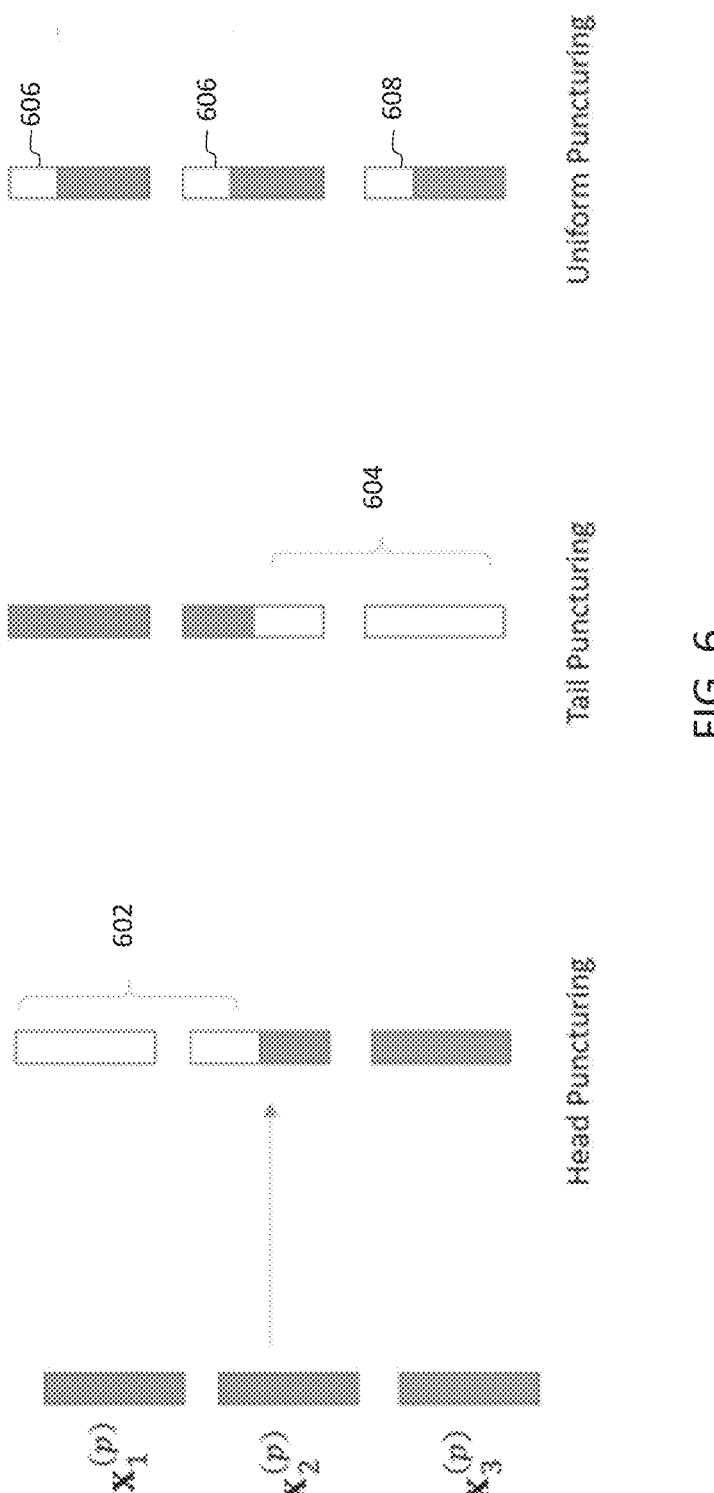
FIG. 6 is a diagram illustrating puncturing patterns, according to an embodiment.

FIG. 6 is a diagram illustrating puncturing patterns, according to an embodiment. In head puncturing, the first a symbols 602 of $$x^{(p)}, x_1^{(p)}, \dots, x_\alpha^{(p)},$$

are punctured. In tail puncturing, the last a symbols 604 of $$x^{(p)}, x_{n-\alpha+1}^{(p)}, \dots, x_n^{(p)},$$

are punctured. In uniform puncturing, the first $$\left\lfloor \frac{\alpha}{3} \right\rfloor$$

symbols 606 of $$x_1^{(p)} \text{ and } x_2^{(p)},$$

are punctured and the first $$\alpha - 2 \left\lfloor \frac{\alpha}{3} \right\rfloor$$

symbols 608 of $$x_3^{(p)}$$

are punctured.

Referring back to FIG. 5, when a desired length-n* codeword x* 512 is shorter than n, a difference in the number of code symbols may be punctured in the length-n codeword x 508 using one of the puncturing patterns described above with respect to FIG. 6.

The length-n* codeword x* 512 may be provided through an AWGN channel 514 to a receiver, however embodiments are not limited to transmission over AWGN channels. It may be assumed that y* 516 is the receiver observation resulting from transmitting codeword x* 512 through the AWGN channel 514. When channel observation y* 516 is shorter than the required length for a TAE decoder 520 due to puncturing, a deterministic value p (e.g., p=0) may be inserted at the punctured symbols to obtain decoder input y 518. When the channel observation y* 516 is longer than the required length for the TAE decoder 520 due to repetition, as shown in FIG. 5, symbol-wise averaging or summation may be performed on observation y* 516 to obtain the decoder input y 518, as set forth in Equation (12) below.

$$y_i = \begin{cases} \frac{1}{p_i} \sum_{j=1}^{p_i} y_i^{(j)}, & p_i > 0 \\ 0, & p_i = 0 \end{cases}, i = 1, \dots, n \tag{12}$$

It may be assumed that $$y_i^{(j)}$$

is the receiver observation associated with $$x_i^{(j)},$$

and $p_i$ is the repetition time of $x_i$. Due to puncturing, $p_i \leq p$, for i=1, ..., n, and 0's are filled to those positions with no transmitted symbols.

The decoder input y 518 may be provided to the TAE decoder 520, which may estimate a length-k message-word û 522 by $g_{\pi,\phi}(y)$, as described above in FIG. 3 and Equations (6) and (7). The estimation of length-k* message-word û* 524 may be obtained as set forth in Equation (13) below, by extracting bits according to the zero-padding pattern.

$$\hat{u}^* = \left[ \hat{u}_{\lfloor \frac{\delta}{2} \rfloor + 1} \quad \cdots \quad \hat{u}_{\lfloor \frac{\delta}{2} \rfloor + k^{\wedge *}} \right] \tag{13}$$

A training method may be provided for a rate-matched TAE that supports q different rates, $r_1, \dots, r_q$, where $r_i$ is specified by $k_i$ and $n_i$. A TAE that is designed for $$r = \frac{k}{3k},$$

as shown in FIG. 5, may not work for all q rates. Therefore, a rate-matched TAE should be trained using batches that contain samples of all considered code rates.

Figure 7:
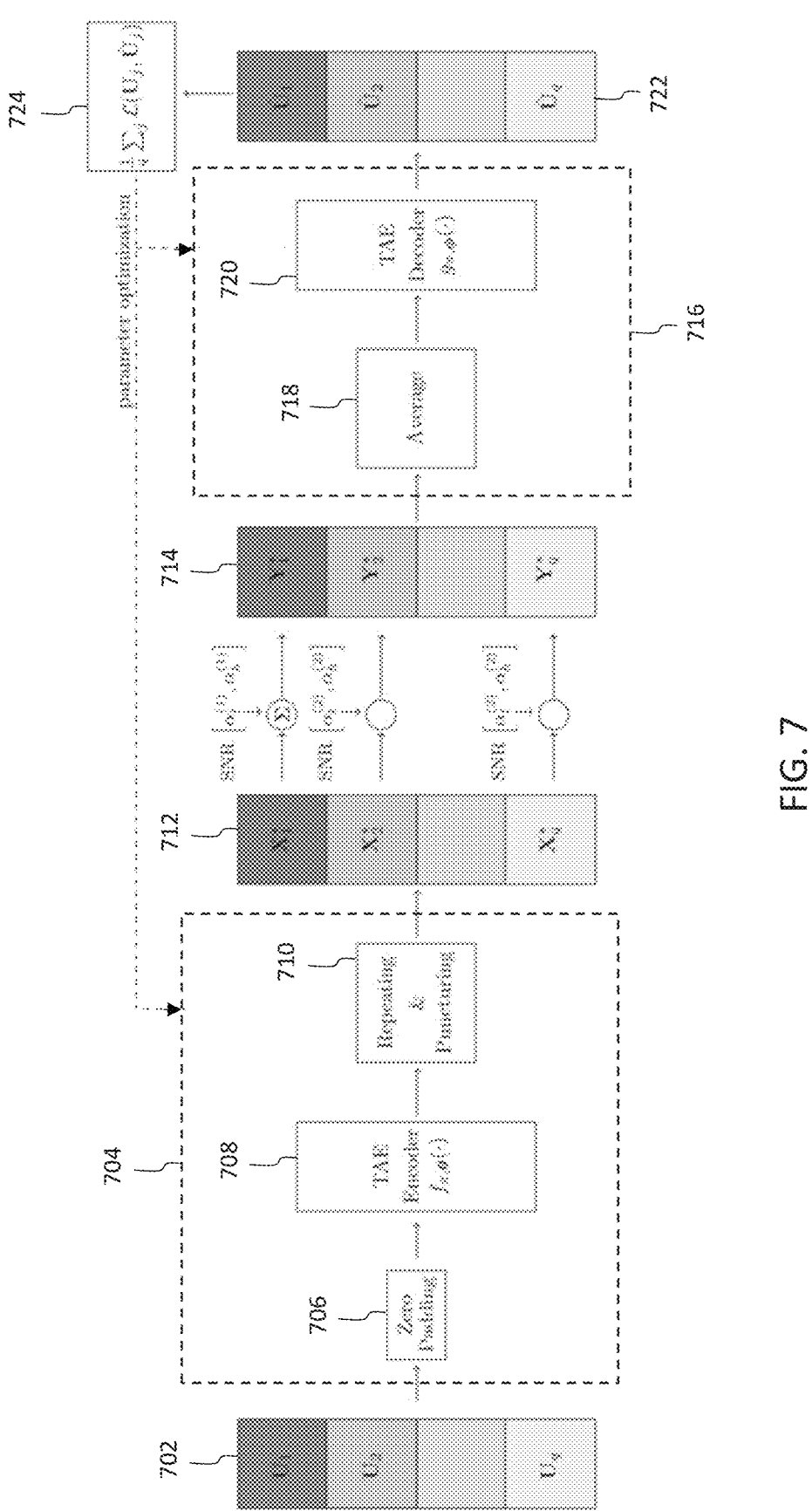
FIG. 7 is a diagram illustrating a training process for a rate-matched TAE, according to an embodiment.

FIG. 7 is a diagram illustrating a training process for a rate-matched TAE, according to an embodiment. As shown in FIG. 7, a batch 702 of message-words may be provided to the training system, and the batch 702 may contain q sub-batches, $$U_1, \dots, U_q \ 702, \text{ where } U_j \in \mathbb{F}_2^{b \times k_j}$$

contains b randomly generated length-$k_j$ message-words. Accordingly, each sub-batch of message-words corresponds to a different code rate and corresponding message-word length. A batch size may be calculated by B=qb. The batch 702 may be provided to a rate-matched TAE encoder 704, having a zero padding module 706, a TAE encoder 708, and a rate-matching module 710. After zero padding, encoding, and rate-matching, as described with respect to FIG. 5 above, $U_j$ may be mapped to $$X_j^* \in \mathbb{R}^{b \times n_j}$$

712, which contains length-$n_j$ codewords. Channel observations $$Y_j^*$$

714 may be generated by adding randomly sampled noise $$N_j \text{ to } X_j^* \in \mathbb{R}^{b \times k_j}$$

712, as set forth in Equation (14) below.

$$Y_j^* = X_j^* + N_j \tag{14}$$

An element that corresponds to the $c^{th}$ column and $i^{th}$ row in $N_j$ may be drawn from $$\mathcal{N}(0, \hat{\sigma}_{c,i}^2), \text{ where } \hat{\sigma}_{c,i}^2$$

may be drawn from the uniform distribution between $$10^{-0.1 \alpha_l^{(j)}} \text{ and } 10^{-0.1 \alpha_h^{(j)}}.$$

Hence, $N_j$ may be described by a training SNR range $$[\alpha_l^{(j)}, \alpha_h^{(j)}].$$

On the decoder side, the channel observations $$Y_j^*$$

714 may be provided to a rate-matched TAE decoder 716, which includes a modifier module 718 and a TAE decoder 720. The modifier module 718 may average the repeated symbols of $$Y_j^*$$

712 may be averaged at the modifier module 718 and encoded at the TAE decoder 720 to generate soft output, as described above with respect to FIG. 5. By taking the middle $k_j$ symbols from the out the rate-matched TAE decoder 716, soft estimation $U_j$, $\hat{U}_j \in \mathbb{R}^{b \times k_j}$, 722 may be obtained. A total loss J 724 may be calculated by $$J = \frac{1}{q} \sum_{j=1}^{q} \mathcal{L}(U_j, \hat{U}_j),$$

where $\mathcal{L}(\cdot, \cdot)$ denotes the loss function. Embodiments may use binary cross entropy as loss function. The total loss 724 may be the average of rate-specific loss over all rates. The total loss 724 may be used to optimize parameters of the rate-matched TAE encoder 704 and the rate-matched TAE decoder 716.

Jointly training the TAE encoder and decoder may trap the TAE in a local optimum. Embodiments may instead iteratively update parameters of the rate-matched TAE encoder and the rate-matched TAE decoder. More specifically, during each training phase, embodiments may first train the rate-matched TAE encoder $T_{enc}$ times by fixing decoder parameters, and then train the rate-matched TAE decoder $T_{dec}$ times by fixing encoder parameters.

The training process for the rate-matched TAE may have two stages. A first stage, which may be referred to as coarse training, may train a model $E_{cor}$ epochs with a batch size $B_{cor}$ and a learning rate $\ell_{cor}$. A second stage, which may be referred to as fine training, may initialize encoder and decoder parameters as those from coarse training, and may train the model $E_{fine}$ epochs with a batch size $B_{fine}$ and a learning rate $\ell_{fine}$.

The encoder and decoder of the rate-matched TAE may be trained with different training SNRs. For a rate-matched TAE with q rates, training SNRs may be specified by $$\left( \alpha_{enc,l}^{(j)}, \alpha_{enc,h}^{(j)}, \alpha_{dec,l}^{(j)}, \alpha_{dec,h}^{(j)} \right), j = 1, \ldots, q.$$

The number of hyper-parameters may become large for a larger q, which may complicate optimization. Accordingly, embodiments may use a training SNR setting of Equations (15) to (18) below.

$$\alpha_{enc,l}^{(j)} = \alpha_{enc,h}^{(j)} = \gamma^{(j)} \quad (15)$$

$$\alpha_{dec,l}^{(j)} = \gamma^{(j)} - 2.5 \quad (16)$$

$$\alpha_{dec,h}^{(j)} = \gamma^{(j)} + 1 \quad (17)$$

The encoder training SNR for rate j may become a point at $\gamma^{(j)}$ dB, the interval of decoder training SNR for rate j may be 3.5 dB, and the boundary may be calculated using $\gamma^{(j)}$.

This above setting may simplify training SNR optimization to a q-dimensional search space $(\gamma^{(1)}, \ldots, \gamma^{(q)})$.

The training SNRs may be of importance for a well-performing AE. Based on an observation of training $$r = \frac{k}{3k} TAE,$$

embodiments may use a heuristic algorithm that uses validation loss as a metric to search $(\gamma^{(1)}, \ldots, \gamma^{(q)})$, as set forth below.

---

Algorithm 1: Training SNRs Searching

---

Initialize: $(\gamma^{(1)}, \ldots, \gamma^{(q)})$
do
  | f = 0;
  | Coarse train rate-matched TAE with $(\gamma^{(1)}, \ldots, \gamma^{(q)})$;
  | for j ← 1 to q do
  |   | if $l_{coa}^{(j)} > 1.1 * 10^{-3}$ then
  |   |   | Increase $\gamma^{(j)}$ by some value; f = 1;
  |   | end
  |   | if $l_{coa}^{(j)} < 0.7 * 10^{-4}$ then
  |   |   | Decrease $\gamma^{(j)}$ by some value; f = 1;
  |   | end
  | end
  while f = 0;
  output: $(\gamma^{(1)}, \ldots, \gamma^{(q)})$

---

Embodiments may define the validation loss of rate j as the BEC between a input batch $U_j$ and corresponded soft output batch $\hat{U}_j$ under channel SNR $\gamma^{(j)}$, and the validation loss for rate-j at epoch e is denoted by $$l_e^{(j)}.$$

The algorithm finds $(\gamma^{(1)}, \ldots, \gamma^{(q)})$, such that after coarse training, the validation losses of all rates are in a designated range. An optimal $(\gamma^{(1)}, \ldots, \gamma^{(q)})$ that delivers the best model may not be guaranteed.

The validation loss may reflect a noise level for encoder and decoder training SNRs. Small validation loss and large validation loss may correspond to small training SNRs and large training SNRs. For a TAE with k=100, n=300, a well-performing model may be trained when the validation loss converges to around $9*10^{-4}$ after coarse training. Accordingly, embodiments may find $(\gamma^{(1)}, \ldots, \gamma^{(q)})$ such that the validation loss of each rate after coarse training converges to $[0.7, 1.1]*10^{-3}$.

Tuning a single $\gamma^{(j)}$ by fixing all other values may affect the performance of all rates, because it may change the gradient calculation of the whole rate-matched TAE model. However, there is no deterministic relationship on how tuning one $\gamma^{(j)}$ impacts all other rates.

Figure 8:
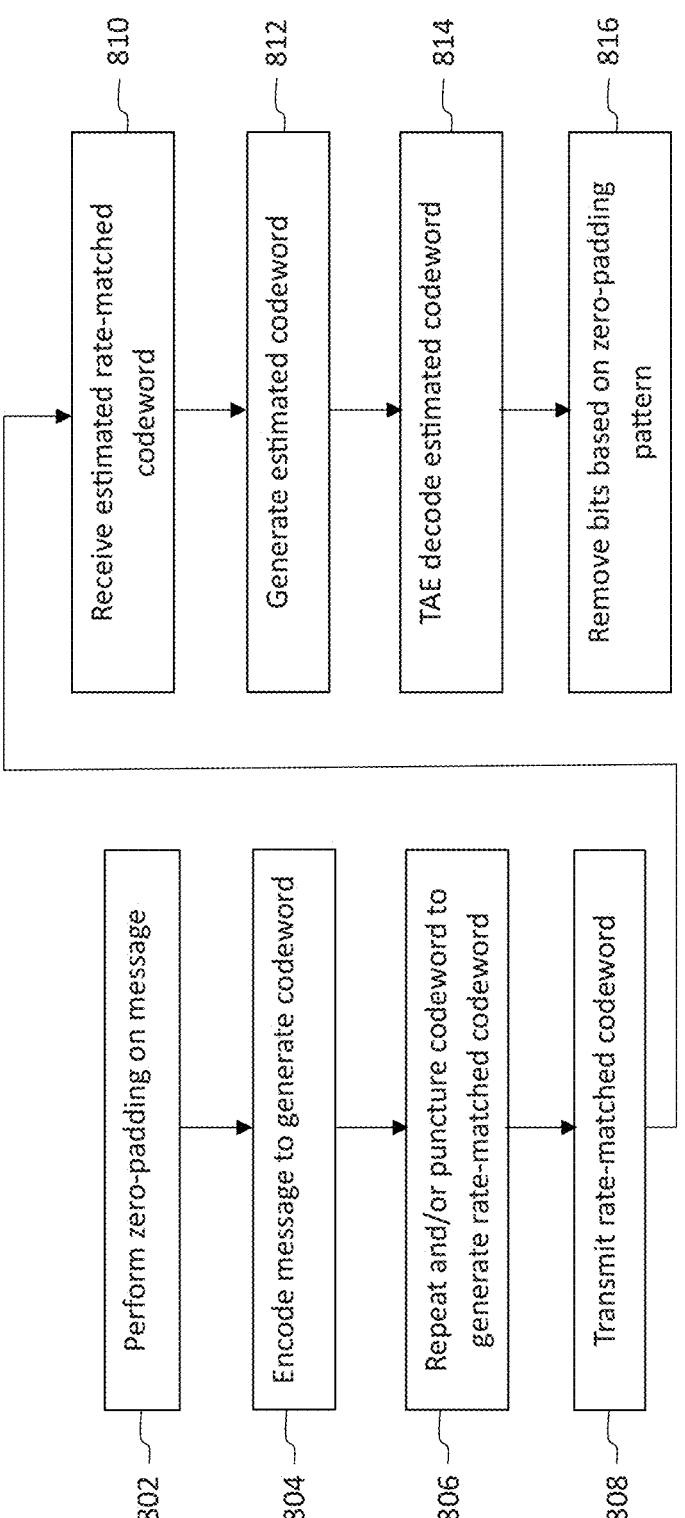
FIG. 8 is a flowchart illustrating a method for TAE rate-matching at transmitting and receiving devices, according to an embodiment.

FIG. 8 is a flowchart illustrating a method for TAE rate-matching at transmitting and receiving devices, according to an embodiment. At 802, a transmitting device zero-pads a message (or message-word) by adding one or more zeros to both ends of the message to generate a modified message having a first length corresponding to a first code rate of a TAE encoder. At 804, the TAE encoder of an electronic device encodes the modified message to generate a codeword having a second length corresponding to the first code rate.

At 806, the codeword may be repeated and/or punctured to generate a rate-matched codeword having a third length corresponding to a second code rate. The codeword may be punctured to generate the rate-matched codeword, or the codeword may be repeated and then punctured to generate the rate-matched codeword. The repeated codeword may be punctured in order, beginning at a first code symbol of a last repetition of the codeword, the codeword may be punctured in reverse order, beginning at a last code symbol of the last repetition of the codeword, or the codeword may be uniformly punctured at each codeword component of the last repetition of the codeword. At 808, the rate-matched codeword is transmitted by the transmitting device.

At 810, a receiving device estimates the rate-matched codeword via a channel observation. At 812, the estimated rate-matched codeword is modified to generate an estimated codeword having the second length corresponding to the first code rate of the TAE decoder. One or more values may be added to the estimated rate-matched codeword to generate the estimated codeword, or values across symbols of the estimated rate-matched codeword may be averaged or summed to generate the estimated codeword. At 814, the estimated codeword is decoded by the TAE decoder to generate an estimated message. At 816, one or more bits may be removed from both ends of the estimated message, according to the zero-padding pattern used in the transmitting device, to generate a modified message having a fourth length corresponding to the second code rate.

Figure 9:
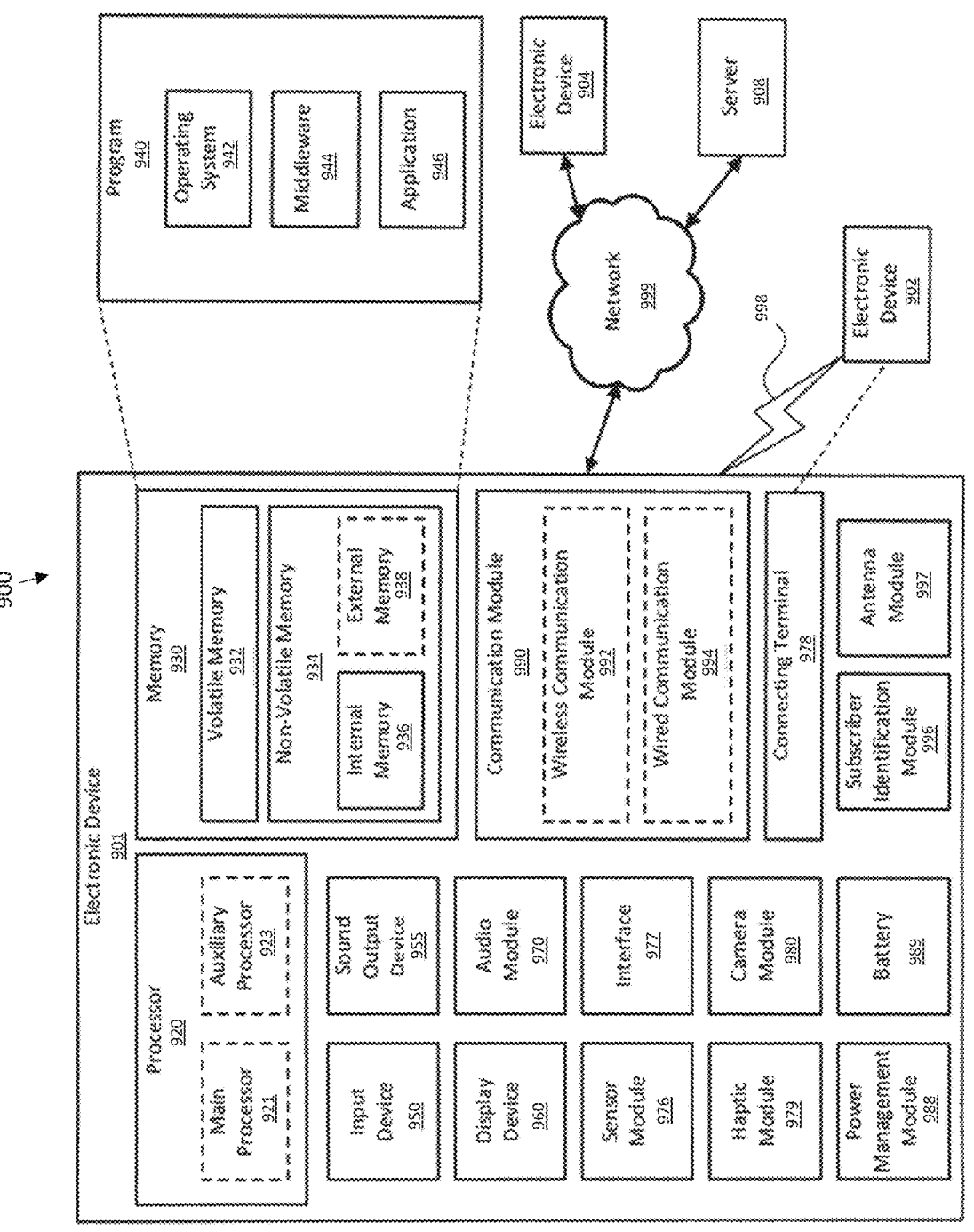
FIG. 9 is a block diagram of an electronic device in a network environment, according to an embodiment.

FIG. 9 is a block diagram of an electronic device in a network environment 900, according to an embodiment.

Referring to FIG. 9, an electronic device 901 in a network environment 900 may communicate with an electronic device 902 via a first network 998 (e.g., a short-range wireless communication network), or an electronic device 904 or a server 908 via a second network 999 (e.g., a long-range wireless communication network). The electronic device 901 may communicate with the electronic device 904 via the server 908. The electronic device 901 may be the transmitting device 102 or the receiving device 104 of the rate-matched TAE system of FIG. 1. The first network 998 or the second network 999 may function as the AWGN channel 514.

The electronic device 901 may include a processor 920, a memory 930, an input device 950, a sound output device 955, a display device 960, an audio module 970, a sensor module 976, an interface 977, a haptic module 979, a camera module 980, a power management module 988, a battery 989, a communication module 990, a subscriber identification module (SIM) card 996, or an antenna module 997. In one embodiment, at least one (e.g., the display device 960 or the camera module 980) of the components may be omitted from the electronic device 901, or one or more other components may be added to the electronic device 901. Some of the components may be implemented as a single integrated circuit (IC). For example, the sensor module 976 (e.g., a fingerprint sensor, an iris sensor, or an illuminance sensor) may be embedded in the display device 960 (e.g., a display).

The processor 920 may execute software (e.g., a program 940) to control at least one other component (e.g., a hardware or a software component) of the electronic device 901 coupled with the processor 920 and may perform various data processing or computations. The processor 920 may execute functions associated with zero-padding, encoding, decoding, and rate-matching described above with respect to FIGS. 1-8.

As at least part of the data processing or computations, the processor 920 may load a command or data received from another component (e.g., the sensor module 976 or the communication module 990) in volatile memory 932, process the command or the data stored in the volatile memory 932, and store resulting data in non-volatile memory 934. The processor 920 may include a main processor 921 (e.g., a central processing unit (CPU) or an application processor (AP)), and an auxiliary processor 923 (e.g., a graphics processing unit (GPU), an image signal processor (ISP), a sensor hub processor, or a communication processor (CP)) that is operable independently from, or in conjunction with, the main processor 921. Additionally or alternatively, the auxiliary processor 923 may be adapted to consume less power than the main processor 921, or execute a particular function. The auxiliary processor 923 may be implemented as being separate from, or a part of, the main processor 921.

The auxiliary processor 923 may control at least some of the functions or states related to at least one component (e.g., the display device 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). The auxiliary processor 923 (e.g., an image signal processor or a communication processor) may be implemented as part of another component (e.g., the camera module 980 or the communication module 990) functionally related to the auxiliary processor 923.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934. Non-volatile memory 934 may include internal memory 936 and/or external memory 938.

The program 940 may be stored in the memory 930 as software, and may include, for example, an operating system (OS) 942, middleware 944, or an application 946.

The input device 950 may receive a command or data to be used by another component (e.g., the processor 920) of the electronic device 901, from the outside (e.g., a user) of the electronic device 901. The input device 950 may include, for example, a microphone, a mouse, or a keyboard.

The sound output device 955 may output sound signals to the outside of the electronic device 901. The sound output device 955 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 960 may visually provide information to the outside (e.g., a user) of the electronic device 901. The display device 960 may include, for example, a display, a hologram device, or a projector and control circuitry to control a corresponding one of the display, hologram device, and projector. The display device 960 may include touch circuitry adapted to detect a touch, or sensor circuitry (e.g., a pressure sensor) adapted to measure the intensity of force incurred by the touch.

The audio module 970 may convert a sound into an electrical signal and vice versa. The audio module 970 may obtain the sound via the input device 950 or output the sound via the sound output device 955 or a headphone of an external electronic device 902 directly (e.g., wired) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. The sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device 902 directly (e.g., wired) or wirelessly. The interface 977 may include, for example, a high-definition multimedia interface (HDMI), a universal serial bus (USB) interface, a secure digital (SD) card interface, or an audio interface.

A connecting terminal 978 may include a connector via which the electronic device 901 may be physically connected with the external electronic device 902. The connecting terminal 978 may include, for example, an HDMI connector, a USB connector, an SD card connector, or an audio connector (e.g., a headphone connector).

The haptic module 979 may convert an electrical signal into a mechanical stimulus (e.g., a vibration or a movement) or an electrical stimulus which may be recognized by a user via tactile sensation or kinesthetic sensation. The haptic module 979 may include, for example, a motor, a piezoelectric element, or an electrical stimulator.

The camera module 980 may capture a still image or moving images. The camera module 980 may include one or more lenses, image sensors, image signal processors, or flashes. The power management module 988 may manage power supplied to the electronic device 901. The power management module 988 may be implemented as at least part of, for example, a power management integrated circuit (PMIC).

The battery 989 may supply power to at least one component of the electronic device 901. The battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the AP) and supports a direct (e.g., wired) communication or a wireless communication. The communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as BLUETOOTH™, wireless-fidelity (Wi-Fi) direct, or a standard of the Infrared Data Association (IrDA)) or the second network 999 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The antenna module 997 may transmit or receive a signal or power to or from the outside (e.g., the external electronic device) of the electronic device 901. The antenna module 997 may include one or more antennas, and, therefrom, at least one antenna appropriate for a communication scheme used in the communication network, such as the first network 998 or the second network 999, may be selected, for example, by the communication module 990 (e.g., the wireless communication module 992). The signal or the power may then be transmitted or received between the communication module 990 and the external electronic device via the selected at least one antenna.

Commands or data may be transmitted or received between the electronic device 901 and the external electronic device 904 via the server 908 coupled with the second network 999. Each of the electronic devices 902 and 904 may be a device of a same type as, or a different type, from the electronic device 901. All or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 901. The electronic device 901 may provide the outcome, with or without further processing of the outcome, as at least part of a reply to the request. To that end, a cloud computing, distributed computing, or client-server computing technology may be used, for example.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A method comprising:
encoding a message, by a neural encoder of an electronic device, to generate a codeword having a first length corresponding to a first code rate of the neural encoder, wherein a number of components of the codeword corresponds to the first code rate;
performing at least one of repeating the codeword or puncturing of at least one of the codeword, by a processor of the electronic device, to generate a rate-matched codeword having a second length corresponding to a second code rate; and
transmitting the rate-matched codeword by the electronic device,
wherein performing at least one of repeating or puncturing of the codeword comprises:
repeating the codeword to generate a repeated codeword; and
puncturing the repeated codeword to generate the rate-matched codeword having the second length.

2. The method of claim 1, further comprising:
adding one or more zeros to the message to generate a modified message having a third length corresponding to the first code rate,
wherein the modified message is encoded by the neural encoder.

3. The method of claim 1, wherein performing at least one of repeating or puncturing of the codeword comprises:
puncturing the codeword to generate the rate-matched codeword having the second length less than the first length.

4. The method of claim 1, wherein puncturing the repeated codeword comprises:
puncturing the repeated codeword, in order, beginning at a first code symbol of a last repetition the codeword;
puncturing the repeated codeword, in reverse order, beginning at a last code symbol of the last repetition of the codeword; or
uniformly puncturing each codeword component of the last repetition of the codeword.

5. The method of claim 1, wherein the codeword comprises a plurality of codeword components, and a number of the codeword components corresponds to the first code rate.

6. A method comprising:
estimating, at an electronic device, a rate-matched codeword having a first length corresponding to a first code rate;
modifying, by a processor of the electronic device, the rate-matched codeword to generate a codeword having a second length corresponding to a second code rate of a neural decoder, wherein a number of components of the codeword corresponds to the second code rate, the modifying comprising generating the codeword having the second length by averaging or summing values across symbols of the rate-matched codeword; and
decoding the codeword, by the neural decoder of the electronic device, to generate a message.

7. The method of claim 6, further comprising:
removing one or more bits from both ends of the message, based on a zero-padding pattern, to generate a modified message having a third length corresponding to the first code rate.

8. The method of claim 6, wherein modifying the rate-matched codeword comprises:
adding one or more values to the rate-matched codeword to generate the codeword having the second length.

9. The method of claim 6, wherein the codeword comprises a plurality of codeword components, a number of the codeword components corresponds to the second code rate.

10. A method comprising:
encoding and rate-matching a first set of messages, by a rate-matched neural encoder, to generate a first set of rate-matched codewords, wherein the first set of messages comprises subsets, each subset corresponding to a different code rate;
adding noise to the first set of rate-matched codewords to generate a second set of received codewords;

modifying and decoding the second set of received codewords, by a rate-matched neural decoder, to generate a second set of messages; and determining an average loss between the first set of messages and the second set of messages across the different code rates; and modifying a parameter of at least one of the rate-matched neural encoder or the rate-matched neural decoder based on the average loss.

11. The method of claim 10, wherein adding the noise comprises adding noise based on different signal-to-noise ratios (SNRs).

12. The method of claim 11, wherein a number of the different SNRs is based on a number of the different code rates.

13. The method of claim 12, wherein the different SNRs are determined based on a convergence of a validation loss for each of the different code rates after course training.

14. A system comprising:

a first electronic device configured to:

encode a message, by a neural encoder, to generate a codeword having a first length corresponding to a first code rate of the neural encoder, wherein a number of components of the codeword corresponds the first code rate;

perform at least one of repeating the codeword or puncturing at least one of the codeword to generate a rate-matched codeword having a second length corresponding to a second code rate; and transmit the rate-matched codeword; and a second electronic device configured to:

estimate the rate-matched codeword;

modify the estimate of the rate-matched codeword to generate an estimated codeword having the first length corresponding to the first code rate of a neural decoder; and decode the estimated codeword, by the neural decoder, to generate an estimated message.

15. The system of claim 14, wherein:

the first electronic device is further configured to add one or more zeros to both ends of the message to generate a modified message having a third length corresponding to the first code rate, wherein the modified message is encoded by the neural encoder; and the second electronic device is further configured to remove the one or more zeros from both ends of the estimated message to generate a modified estimated message having a fourth length corresponding to the second code rate.

16. The system of claim 14, wherein:

in performing at least one of repeating or puncturing of the codeword, the first electronic device is further configured to puncture the codeword to generate the rate-matched codeword having the second length; and in modifying the estimate of the rate-matched codeword, the second electronic device is further configured to add one or more values to the estimate of the rate-matched codeword to generate the estimated codeword having the first length.

17. The system of claim 14, wherein:

in performing at least one of repeating or puncturing of the codeword, the first electronic device is further configured to:

repeat the codeword to generate a repeated codeword having a fifth length greater than the second length; and puncture the repeated codeword to generate the rate-matched codeword having the second length; and in modifying the estimate of the rate-matched codeword, the second electronic device is further configured to generate the estimated codeword having the first length by averaging or summing values across symbols of the estimate of the rate-matched codeword.

18. The system of claim 17, wherein, in puncturing the repeated codeword, the first electronic device is further configured to:

puncture the repeated codeword, in order, beginning at a first code symbol of a last repetition the codeword;

puncture the repeated codeword, in reverse order, beginning at a last code symbol of the last repetition of the codeword; or uniformly puncture each codeword component of the last repetition of the codeword.

19. The system of claim 14, wherein the codeword comprises a plurality of codeword components, and a number of the codeword components corresponds to the first code rate.

* * * * *